(12) United States Patent
Lee et al.

(10) Patent No.: US 11,794,625 B2
(45) Date of Patent: Oct. 24, 2023

(54) VEHICULAR PRESSURE VESSEL MOUNTING SYSTEM

(71) Applicant: Echeneidae Inc., Livonia, MI (US)

(72) Inventors: Matthew Lee, Livonia, MI (US); Eric Harding, Livonia, MI (US)

(73) Assignee: Echeneidae Inc., Wixom, MI (US)

( * ) Notice: Subject to any disclaimer, the term of this patent is extended or adjusted under 35 U.S.C. 154(b) by 0 days.

(21) Appl. No.: 18/063,763

(22) Filed: Dec. 9, 2022

(65) Prior Publication Data

US 2023/0182634 A1    Jun. 15, 2023

Related U.S. Application Data

(60) Provisional application No. 63/288,362, filed on Dec. 10, 2021.

(51) Int. Cl.
*B60P 3/22* (2006.01)

(52) U.S. Cl.
CPC ................... *B60P 3/2215* (2013.01)

(58) Field of Classification Search
CPC ..................................... B60P 3/2215
USPC ......................................... 280/834
See application file for complete search history.

(56) References Cited

U.S. PATENT DOCUMENTS

| | | | |
|---|---|---|---|
| 4,899,895 A | 2/1990 | Espasandin et al. | |
| 5,362,022 A * | 11/1994 | McLoughlin | A62B 25/00 224/628 |
| 8,191,848 B2 * | 6/2012 | McLoughlin | A62B 25/00 297/188.04 |
| 8,807,256 B2 * | 8/2014 | Gibb | B60K 15/07 180/69.5 |
| 9,499,105 B1 * | 11/2016 | Long | B60P 3/055 |
| 9,656,759 B2 * | 5/2017 | De La Fuente Carnero | A62B 25/005 |
| 2013/0334269 A1 | 12/2013 | Cardonna et al. | |
| 2019/0255941 A1 | 8/2019 | Gibb et al. | |
| 2020/0032690 A1 | 1/2020 | Hengst et al. | |

OTHER PUBLICATIONS

PCT, International Search Report and Written Opinion of The International Searching Authority for Application PCT/US22/52362 dated Mar. 10, 2023.

* cited by examiner

*Primary Examiner* — Tony H Winner
(74) *Attorney, Agent, or Firm* — Patterson + Sheridan, LLP

(57) ABSTRACT

A vehicular vessel mounting system is provided. In one aspect, a vehicular vessel mounting system includes a mount arranged to support a pressure vessel in a substantially vertical orientation. The mount includes a vertically oriented spine and a backing connected to the spine. The backing is shaped to match an outer wall of the pressure vessel. One or more retention mechanisms are arranged to retain the pressure vessel to the backing.

26 Claims, 10 Drawing Sheets

VEHICULAR PRESSURE VESSEL MOUNTING SYSTEM

CROSS REFERENCE TO RELATED APPLICATIONS

The present application claims the benefit of U.S. Provisional Patent Application Ser. No. 63/288,362, filed on Dec. 10, 2021, entitled "VEHICULAR PRESSURE VESSEL MOUNTING SYSTEM," which is incorporated herein by reference in its entirety.

TECHNICAL FIELD

This invention relates generally to the vehicle structures field, and more specifically to a new and useful vehicular pressure vessel mounting system and/or method in the vehicle structures field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

The system 100 can include: an optional set of pressure vessels; a set of mounts; a retention mechanism; and an optional subframe. However, the system 100 can additionally or alternatively include any other suitable set of components. The system functions to retain and structurally support one or more pressure vessels (e.g., such as carbon-recapture vessels) on a vehicle platform.

Figure 3:
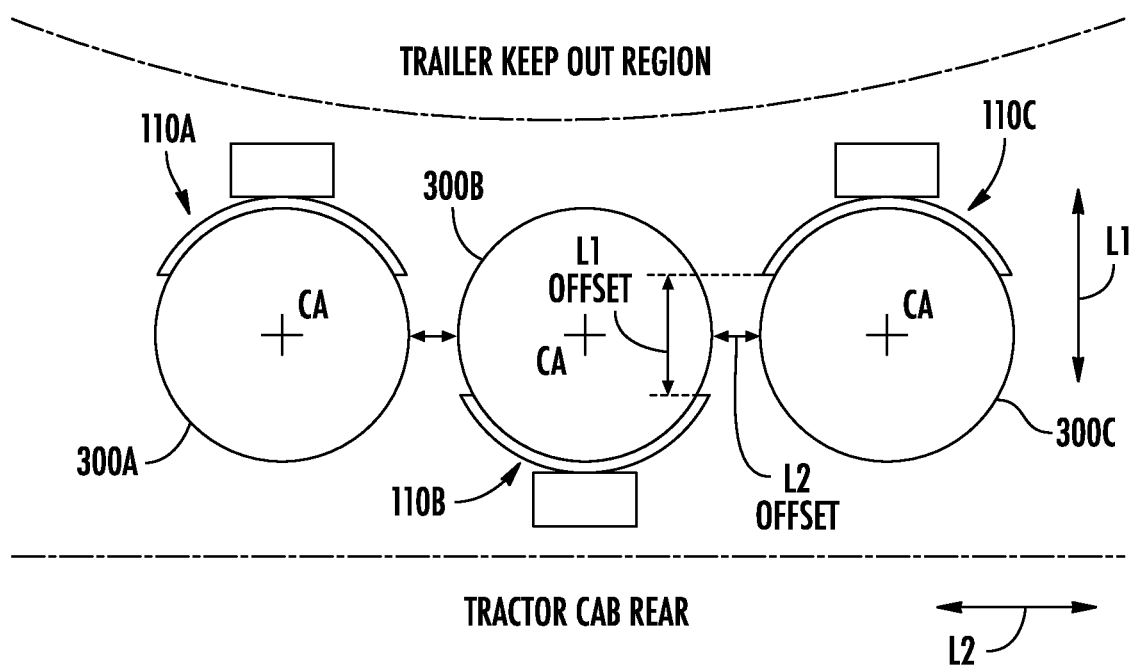
FIG. 3 is a schematic representation of a variant of the system, illustrating an arrangement relative to a vehicle frame from a top view.

In variants, the system can include or be used with a vehicle platform such as the frame of a Class 8 tractor (or semi-truck) or combination tractor-trailer. The system is preferably configured to mount the pressure vessel(s) on the tractor frame between the rear of the cab and the fifth wheel (and/or a keep-out region swept by the trailer during cornering; an example is shown in FIG. 3), but can be otherwise suitably configured. Additionally or alternatively, the system can be configured to interface with any suitable automotive vehicle, truck, watercraft, aerial vehicle, railway vehicle, or other suitable vehicle frame/chassis.

The term 'substantially' as utilized herein, in reference to a vertical direction (i.e. "substantially vertically") or otherwise, can mean: exactly, approximately, within a predetermined threshold or tolerance, and/or have any other suitable meaning. As an example, a substantially vertical axis can be: aligned with a weight vector, within a predetermined number of degrees of a gravitation axis (e.g., having a complementary angle with an altitude angle which is less than 5 degrees, 5 degrees, 10 degrees, 30 degrees, and/or any range bounded by the aforementioned values) and/or weight vector, within a predetermined number of degrees of a vertical/yaw axis of the vehicle (e.g., skewed by less than 5 degrees, 5 degrees, 10 degrees, 30 degrees, etc.), parallel to a central axis of a trailer kingpin and/or axis of rotation of a fifth wheel coupling, closer to vertical than horizontal, and/or otherwise defined. Vertical directions/axes can be defined globally in an earth coordinate frame (e.g., parallel a gravity vector) and/or in relative terms (e.g., relative to a vehicle frame/subframe).

2. Benefits.

Variations of the technology can afford several benefits and/or advantages.

First, variations of this technology can facilitate carbon storage proximal to the vehicle exhaust of a Class 8 tractor which can enable $CO_2$ harvesting/recapture onboard the vehicle. In variants, this technology can enable the recapture of more than 500 lbs of $CO_2$ (e.g., 2000 lbs) while remaining within the regulatory vehicle constraints of a Class 8 vehicle frame and/or axle (e.g., a weight limit of 18,000 lbs per axle, etc.).

Second, variations of this technology can facilitate vertical mounting of composite overwrapped pressure vessels (COPVs) on a vehicle platform, which can enable COPVs to be arranged between the cab of a tractor and a trailer with increased packing density and/or mass efficiency. More specifically, variants can structurally support COPVs without transferring axial loads through the end(s) of the vessel, which might otherwise result in adverse forces or stress concentrations that could damage the vessel. Instead, axial loads (such as those resulting from the weight of the vessel and/or dynamic loads) can be reacted through the outer wall (e.g., cylindrical wall) of the vessel and distributed along the span (e.g., nonuniformly, over an area in frictional contact with the mount, etc.).

Third, variations of this technology can be resilient to volumetric and/or geometric changes in mounted pressure vessels (e.g., such as may result during carbon recapture/storage in a COPV). In variants, retention mechanisms can be pre-loaded and elastically deformable to accommodate dimensional changes of the pressure vessel (e.g., in the radial direction), while continuously providing sufficient radial force to retain the vessel in dynamic and static load cases (e.g., maintaining static friction at the bearing surfaces of the mount and/or retention mechanism).

Fourth, variations of this technology can facilitate mounting of a plurality of pressure vessels without transferring forces and/or moments between distal (e.g., upper; vertically cantilevered) ends of the vessels. In variants, mechanically decoupling pressure vessels and/or supporting structures can mitigate the influence of common roadway vibrations and/or excitation modes (e.g., between 1 and 250 Hz, low-frequency/high-energy modes, etc.), and can additionally or alternatively provide increased manufacturability and/or serviceability of the system—as individual pressure vessels and/or mounts can be separately installed/removed. In such variants, pressure vessels can be independently mounted to the vehicle frame and/or a subframe rigidly connected thereto.

However, variations of the technology can additionally or alternately provide any other suitable benefits and/or advantages.

3. System.

Figure 1:
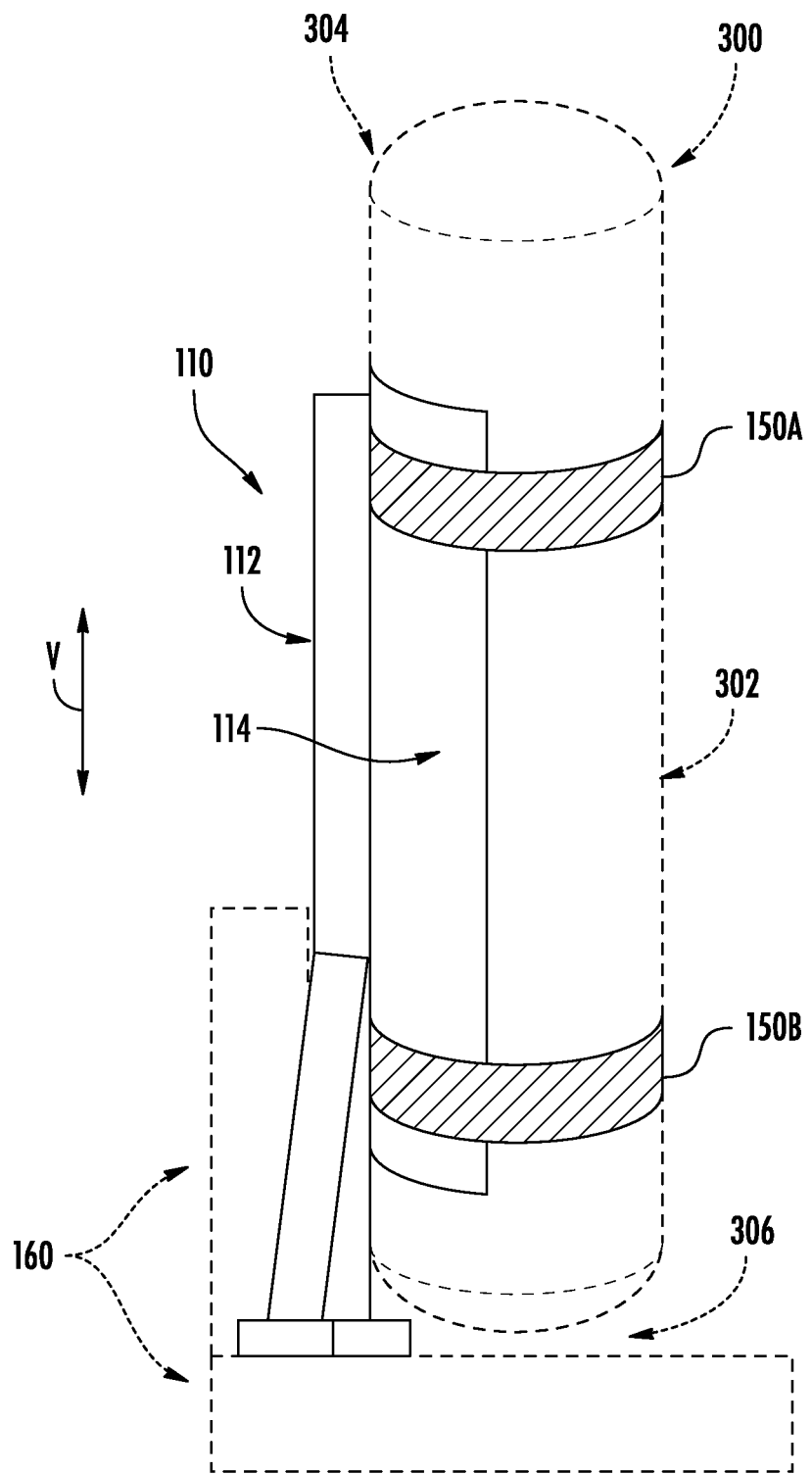
FIG. 1 is a schematic representation of a variant of the system.

The system 100, an example of which is shown in FIG. 1, can include: an optional set of pressure vessels (a single pressure vessel 300 is shown in FIG. 1); a set of mounts (a single mount 110 is shown in FIG. 1); one or more retention mechanisms (a first retention mechanism 150A and a second retention mechanism 150B are shown in FIG. 1); and an optional subframe 160. However, the system 100 can additionally or alternatively include any other suitable set of components. The system functions to retain and structurally support one or more pressure vessels (e.g., such as carbon-recapture vessels) on a vehicle platform. For reference, the system 100 defines a vertical direction V as shown in FIG. 1.

The optional set of pressure vessels can function to contain and/or store a fluid (e.g., carbon dioxide) onboard a vehicle platform. Each pressure vessel preferably includes an outer wall which encapsulates an interior of the vessel and extends between a pair of ends. For instance, in FIG. 1, the pressure vessel 300 has an outer wall 302 and extends between a pair of ends, or between an upper end 304 and a lower end 306. The outer wall is preferably fluidly impermeable (e.g., except through inlet/outlet ports), and can be rigid, semi-rigid, deformable (e.g., elastically deformable within a range of operating pressures), and/or can have any other suitable properties. The outer wall is preferably cylindrical (or substantially cylindrical) about a central axis (e.g., vertical axis) of the vessel between the ends of the vessel (or a portion thereof), but can otherwise be tapered, conical, and/or define a varying cross-sectional area along the central axis (e.g., such as in cases where the walls deform based on non-uniform stress concentrations within the range of operating pressures of the vessel); in examples, tapering may arise in one or more regions of the vessel due to non-uniform bowing, and/or conical aspects may arise in one or more regions of the vessel due to non-circumferential deviations in clamping forces applied to the vessel. The ends of the vessel can be conical, hemispherical, semi-elliptical, planar, and/or any other suitable geometry; in one example, an end of the vessel substantially defines a portion of an elastica solid. The pressure vessel and/or outer wall can be constructed from composites, metals, polymers, and/or any other suitable materials. In a specific example, the pressure vessels can be composite overwrapped pressure vessels (COPVs), such as a Type III COPV. However, the pressure vessels can have any other suitable geometry and/or construction.

In variants, the ends of pressure vessels may be fitted with inlet ports and/or may otherwise be non-load bearing (e.g., not bearing support loads). As an example, ends of a pressure vessel may experience large stress concentrations if the vessel is stood on end, which may damage the vessel or void manufacturer contracts/warranties. As a second example, the ends of a pressure vessel may not be configured to sustain axial loads. Conversely, the outer (cylindrical) wall of the vessel may be the preferred portion of the vessel to react structural mounting loads (e.g., forces, moments; axial and radial forces, etc.) and/or connect to the mount for the vessel independently of the vessel mounting orientation.

Figure 5:
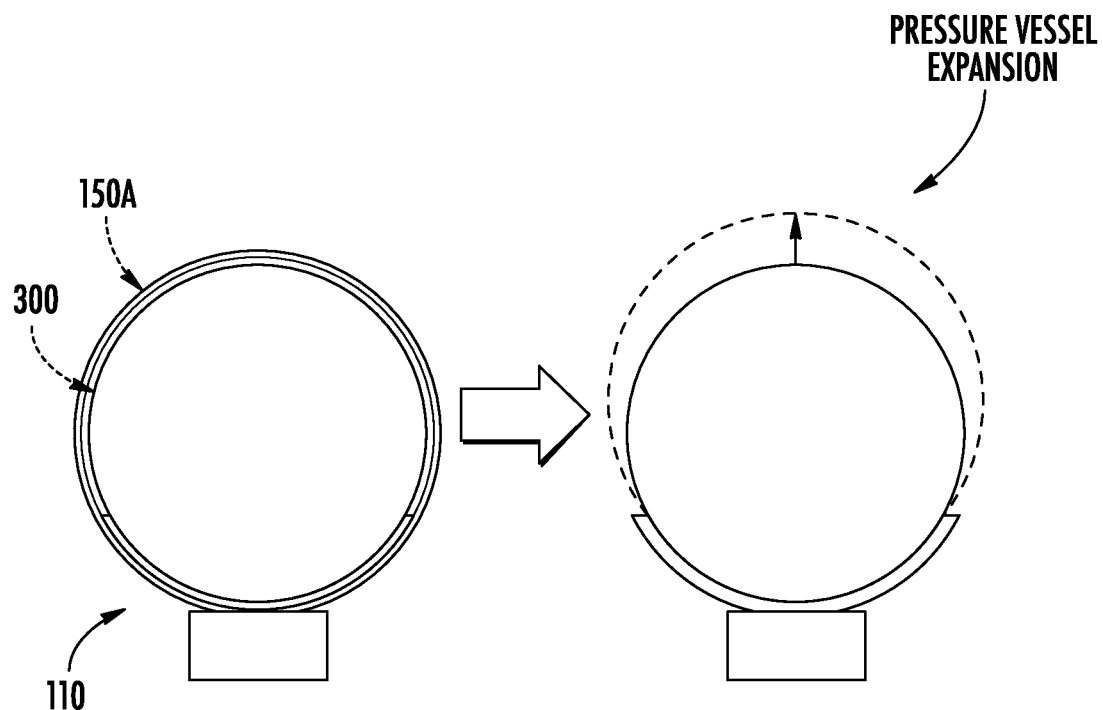
FIG. 5 is an illustrative representation of pressure vessel expansion relative to a mount in one variant of the system.

In variants, the container can be rigid and/or configured to sustain negative pressure, where the volume and/or dimensions of the pressure vessel are invariant/fixed. Alternatively, the container can be (elastically) deformable to accommodate changes of the pressure vessel. In such variants, the radius of the vessel may dynamically change based on the pressure and/or mass of the fluid contained within the vessel interior (an example is shown in FIG. 5).

The set of pressure vessels can include exactly one pressure vessel, at least one pressure vessel per vehicle exhaust pipe/outlet, a plurality of pressure vessels (e.g., two, three, four, five, 6-10, more than 10, etc.), and/or any suitable number of pressure vessels.

However, the system can include any other suitable pressure vessel(s).

The set of mounts functions to structurally support the pressure vessel(s) and transfer forces/moment between the pressure vessels and the subframe (and/or vehicle frame). The set of mounts is preferably configured to arrange (e.g., support, retain, etc.) the pressure vessels in a substantially vertical orientation, such as wherein the spanwise/central axis of each pressure vessel (e.g., of a cylindrical wall thereof) is oriented substantially vertically (e.g., as shown in FIG. 6).

Figure 6:
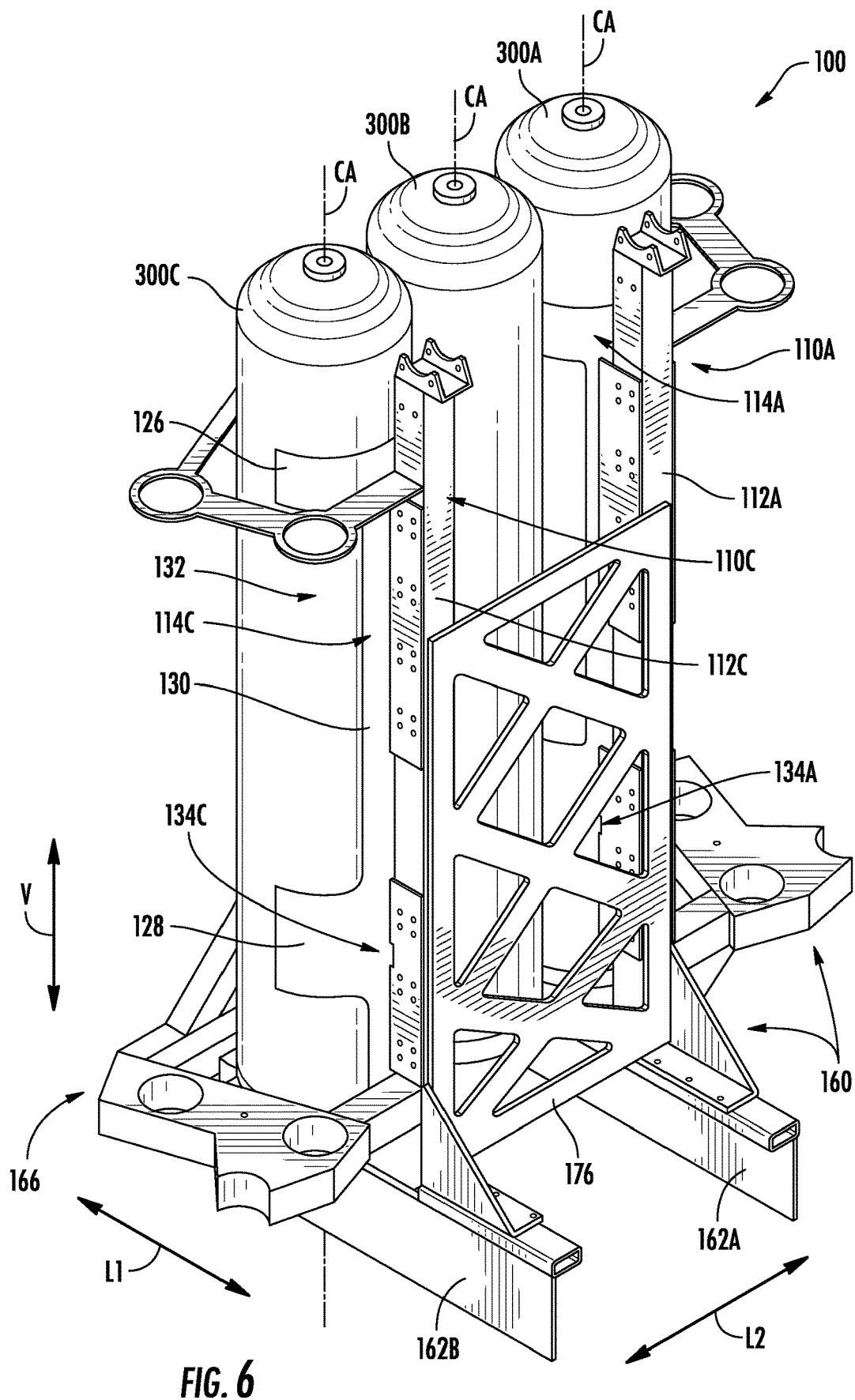
FIG. 6 is an isometric view of a 3D representation of a variant of the system.

For instance, as shown in FIG. 6, the system 100 defines a vertical direction V, a longitudinal direction L1, and a lateral direction L2, which are perpendicular to one another. The longitudinal direction L1 may extend parallel to a longitudinal axis of a vehicle, for example. As depicted in FIG. 6, the set of mounts includes a first mount 110A, a second mount 110B (see FIGS. 7A and 7B), and a third mount 110C. The first mount 110A is configured to arrange a first pressure vessel 300A in a substantially vertical orientation, the second mount 110B is configured to arrange a second pressure vessel 300B in a substantially vertical orientation, and the third mount 110C is configured to arrange a third pressure vessel 300C in a substantially vertical orientation. Stated differently, the first, second, and third mounts 110A, 110B, 110C are each configured to support their respective pressure vessels 310A, 310B, 310C so that the spanwise and/or central axes CA of the pressure vessels 310A, 310B, 310C are substantially aligned or parallel with the vertical direction V.

The mounts preferably mount and/or engage the pressure vessels at the (cylindrical) outer wall without transmitting forces and/or moments through the end(s) of the vessel. In variants, the lower end of the pressure vessel can be physically offset from the mount (e.g., not in contact with the mount) and/or subframe, or force transmission between the end of the pressure vessel can otherwise be limited to a predetermined force threshold (e.g., based on a maximum compression of an elastomeric or deformable component, based on a pressure vessel manufacturer specification, etc.; zero force transmission axially at the lower end of the pressure vessel). Instead, forces/moments can be transmitted between the mounts and the pressure vessels at an engaged portion (e.g., bearing surface) of the outer wall.

In variants, mounts can include a backing, which functions as a bearing surface and/or contacts the pressure vessel over an extended area. Additionally or alternatively, the backing can function to distribute clamping forces from the retention mechanism along a circumferential length of the vessel (e.g., greater circumferential length than a proximal surface of the spine, etc.), which can minimize stress concentrations and improve frictional retention of the pressure vessel. The bearing surface (e.g., surface/area configured to contact the pressure vessel) of the backing is preferably cylindrical (e.g., semi-cylindrical, a partial cylindrical surface, etc.) and/or shaped to match the outer wall of the pressure vessel (e.g., in a nominal load case for a pressure vessel of varying radius; maximum radius of pressure vessel, minimum radius of pressure vessel, etc.; operable to deform to match the outer wall of the pressure vessel; etc.), but can additionally or alternatively be parabolic, planar (or include a set of planar segments, such as for a deformable/compressible backing material), and/or have any other suitable geometry; accordingly, the bearing surface is preferably concave (but can alternatively include one or more convex regions). The backing can extend along a spanwise (axial) portion of the pressure vessel which exceeds a vertical dimension (e.g., width of a band clamp) of the retention mechanism. Alternatively, the backing can extend along a spanwise (axial) portion of the pressure vessel which is 5%, 15%, 25%, 50%, 75%, greater than 75%, any range bounded by the aforementioned values, and/or any other suitable portion of the span of the pressure vessel. The backing preferably extends circumferentially around less than half of the pressure vessel, sweeping a polar angle about the central axis of the pressure vessel which is less than 180 degrees (e.g., between 20 degrees and 170 degrees, etc.), but can alternatively have any other suitable geometry and/or define any other circumferential engagement area relative to the pressure vessel.

In one variant, such as where a pair of retention mechanisms (e.g., T-bolt clamps) are used to secure the pressure vessel to the mount, the backing can extend between the pair of retention mechanisms (e.g., as shown in FIG. 1). The mount can include a singular backing or a split backing (e.g., split into multiple elements; one backing per retention mechanism, one backing per pressure vessel, etc.). However, the mounts can include any other suitable backing(s).

The mount (e.g., backing and/or other components thereof) can optionally include structural folds, mass-reduction cutouts (e.g., where stress and/or contact forces are low, such as at the edge of the backing equidistant to a pair of retention mechanisms), clearance holes/cutouts (e.g., retention mechanism clearance cutouts), fillets, flanges, and/or any other suitable geometric features. In some variants, for example, the backing can define a cutout (e.g., a mass reduction cutout). For instance, as shown in FIG. 6, the third mount 110C has a backing 114C defining a cutout 132. Particularly, the backing 114C has a top support 126, a bottom support 128, and a center support 130 connecting the top support 126 and the bottom support 128. The center support 130 extends circumferentially about the third pressure vessel 300C so that a polar angle of the center support 130 swept about the central axis of the third pressure vessel 300C is less than a polar angle of the top support 126 swept about the central axis and less than a polar angle of the bottom support 128 swept about the central axis. In this way, the cutout 132 is defined by the backing 114C. It will be appreciated that the other mounts (e.g., the first mount 110A and/or the second mount 110B) can additionally or alternatively define such cutouts as well. Further, in some variants, the swept polar angles of the top and bottom supports 126, 128 can be the same. In other variants, the swept polar angles of the top and bottom supports 126, 128 can be different. In some additional variants, the polar angles of the top and bottom supports 126, 128 can each be at least twice greater than the swept polar angle of the center support 130. In yet other variants, (e.g., as shown in FIG. 6), the bottom support 128 can span vertically a greater distance than does the top support 126, wherein the bottom support 128 is provided vertically below the cutout 132 and the top support 126 is provided vertically above the cutout 132.

In variants, mounts can optionally include a spine, which functions to stiffen the backing plate and transfer forces/moments between the backing plate and the subframe (and/or vehicle frame). The spine preferably extends substantially vertically and/or parallel to the axis of the pressure vessel along the height of the backing. The spine is preferably connected to the subframe at a base end (e.g., proximal to the vehicle frame; vertically lower end; etc.), but can additionally be connected to the subframe by struts, beam elements, gusset plates, and/or any other suitable structural elements/members. The spine is preferably connected to the backing plate along a convex and/or radially outward side, but can additionally or alternatively be connected on a surface opposite the bearing surface of the backing (e.g., opposing across a thickness of the backing plate).

As one example, as shown in FIG. 1, the mount 110 includes a vertically oriented spine 112 and a backing 114 connected to the spine 112. As another example, as depicted in FIG. 6, the first mount 110A includes a vertically oriented spine 112A and a backing 114A connected to the spine 112A, the second mount 110B includes a vertically oriented spine 112B and a backing 114B connected to the spine 112B (FIG. 7B), and the third mount 110C includes a vertically oriented spine 112C and a backing 114C connected to the spine 112C.

Figure 12:
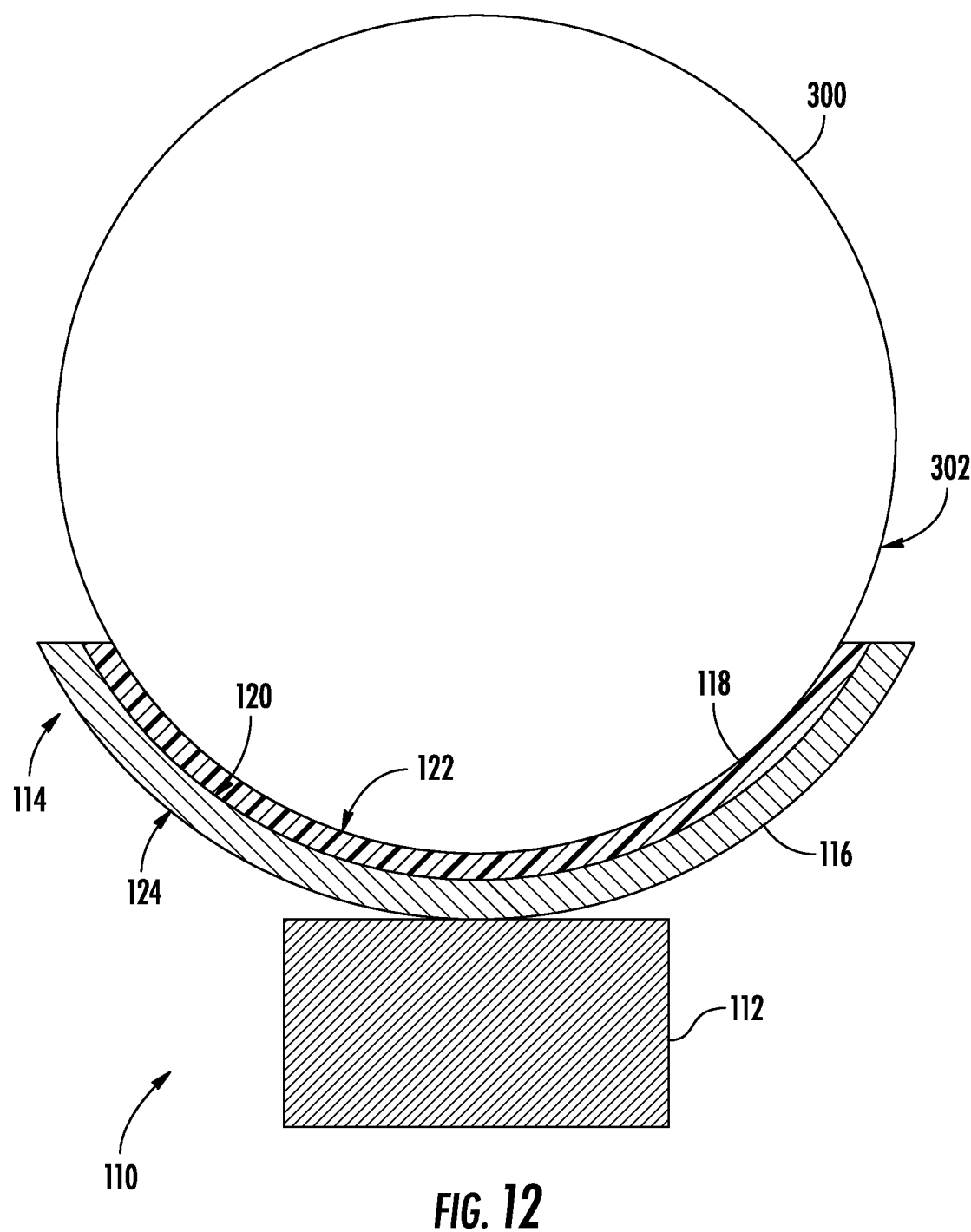
FIG. 12 is a cross-sectional representation of a variant of the system from a top view.

In some variants, a backing of one or mounts can include a backing plate and an elastomer layer attached to the backing plate (e.g., as shown in FIG. 12). The elastomer layer can be formed of an elastomeric material that exhibits elastic or rubber-like properties and the backing plate can be formed of a metallic material. The elastomer layer can be attached to the concave surface of the backing plate, and can extend along or cover a portion or an entirety of the concave surface of the backing plate. The elastomer layer is arranged to be positioned between the backing plate and a pressure vessel. In this way, the pressure vessel does not contact the metallic backing plate but rather a concave surface of the elastomer layer (e.g., as depicted in FIG. 12). This may provide enhanced protection for the pressure vessel. For instance, as shown in FIG. 12, the backing 114 of the mount 110 includes a backing plate 116 and an elastomer layer 118 attached to the backing plate 116. The elastomer layer 118 is attached to a concave surface 120 of the backing plate 116, and as the elastomer layer 118 is shaped and/or has material properties that allow the elastomer layer 118 to match the concave surface 120 of the backing plate 116, the elastomer layer 118 likewise includes a concave surface 122 that contacts the pressure vessel 300. The elastomer layer 118 is arranged to be positioned between the backing plate 116 and the pressure vessel 300 so that the pressure vessel 300 does not contact the backing plate 116, which may protect the outer wall 302 of the pressure vessel 300. A convex surface 124 of the backing plate 116 is connected to the spine 112.

In variants, the spine, backing, and/or any other components of the mount (e.g., reinforcing struts, etc.) can be integrated into a unitary body (e.g., welded, etc.), but can be otherwise fastened together (e.g., bolted, riveted, connected by a series of gusset plates, etc.), and/or otherwise connected. The mount is preferably metal (e.g., 6000-series aluminum, weldable steel, etc.), but can additionally or alternatively include composites, polymers, and/or any other suitable set of materials.

In some further variants, the spines of the mounts can each define one or more cutouts or spaces between the spine and backing. This may allow for a retention mechanism to extend annularly around the backing and a pressure vessel without interfering or engaging the spine. For instance, in FIG. 6, the spine 112A of the first mount 110A is shown defining a cutout 134A that allows for a retention mechanism to extend therethrough and the spine 112C of the third mount 110C is shown defining a cutout 134C that allows for a retention mechanism to extend therethrough. As will be appreciated, the spine 112B of the second mount 110B can likewise define one or more similar cutouts.

Figure 2:
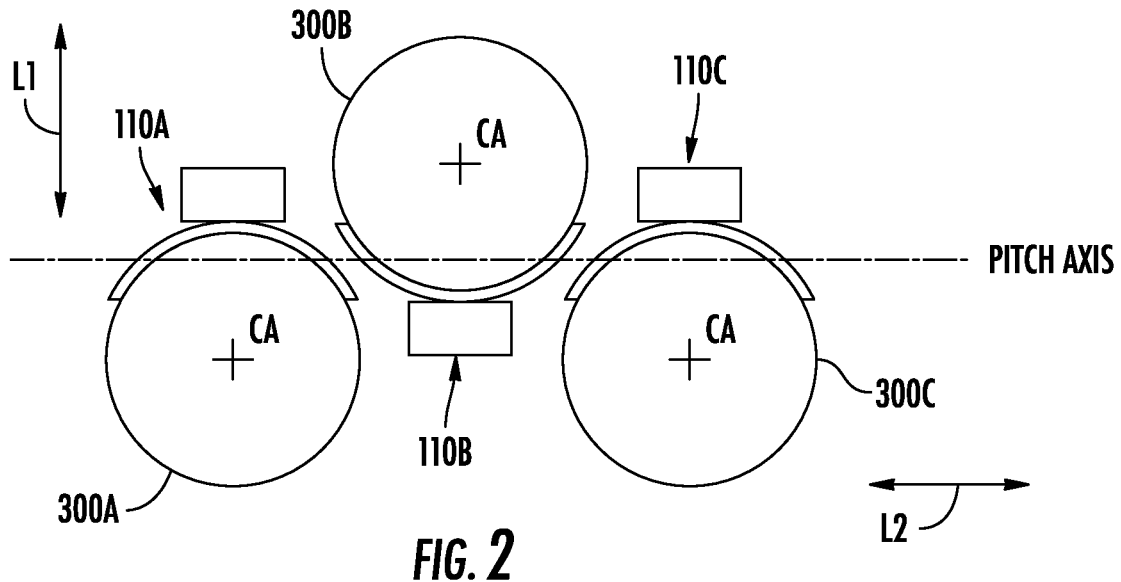
FIG. 2 is a cross-sectional representation of a variant of the system from a top view.

The mounts can position the set of pressure vessels such that the central axes of the pressure vessels are substantially parallel (e.g., when oriented substantially vertically), with the spines (or axes of curvature of the mount backings) likewise arranged in parallel. In variants, the central/spanwise axes of the pressure vessels can be coplanar (an example is shown in FIG. 3 wherein the central axes CA of the pressure vessels are coplanar, or stated more specifically, in FIG. 3, the central axes CA of the first, second, and third pressure vessels 300A, 300B, 300C are shown coplanar (in a plane that extends perpendicular to the longitudinal direction L1)) or can be arranged out of plane (an example is shown in FIG. 2 wherein the central axis CA of one of the pressure vessels is out of plane with the central axes CA of the other two pressure vessels, or stated more specifically, in FIG. 2, the central axis CA of the second pressure vessel 300B is shown out of plane (a plane that extends perpendicular to the longitudinal direction L1) with the central axes CA of the first and third pressure vessels 300A, 300C).

In variants, the spine and/or backing of distinct mounts of the set can be arranged forward (e.g., proximal the tractor cab and/or distal the trailer; relative to a longitudinal axis of the vehicle) or rearward (e.g., distal the tractor cab and/or proximal the trailer; relative to a longitudinal axis of the vehicle) from a mounted pressure vessel (e.g., relative to vehicle frame), on a common side relative to the respectively mounted pressure vessels (e.g., a plurality of spines/backings can be forward of a central axis of a mounted pressure vessel, etc.), disposed on different sides of the respective mounted pressure vessels (e.g., the spine and/or backing of a first mount can be forward of a central axis of a pressure vessel, and the spine and/or backing of a second mount can be rearward of the central axis), and/or in any other suitable relative arrangement. In variants, the adjacent mounts can have a spine and/or backing which mounts on opposing sides of the respective pressure vessels (e.g., in a longitudinal direction; an example is shown in FIGS. 7A-7B and FIGS. 8A-8B). In a specific example, adjacent vertical mounts with opposing orientations (e.g., in a longitudinal direction) may generate opposing and/or self-balancing pitch moments (e.g., resulting from the weight vector associated with the pressure vessel) about a pitch axis (e.g., as shown in FIG. 2), thereby reducing bending moments in various portions of the system and/or vehicle frame (frame rails).

Figure 7A:
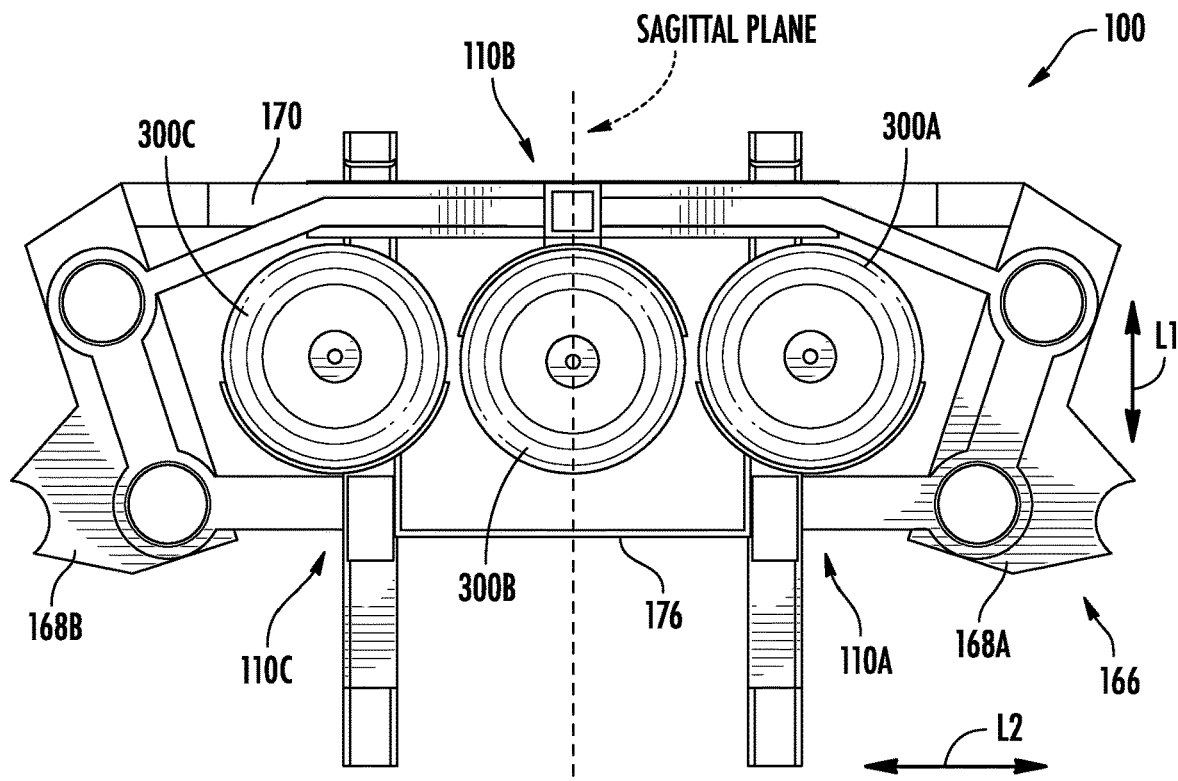
FIGS. 7A and 7B are a first and a second top view of a 3D representation of a variant of the system with mounted pressure vessels and without mounted pressure vessels, respectively.
Figure 7B:
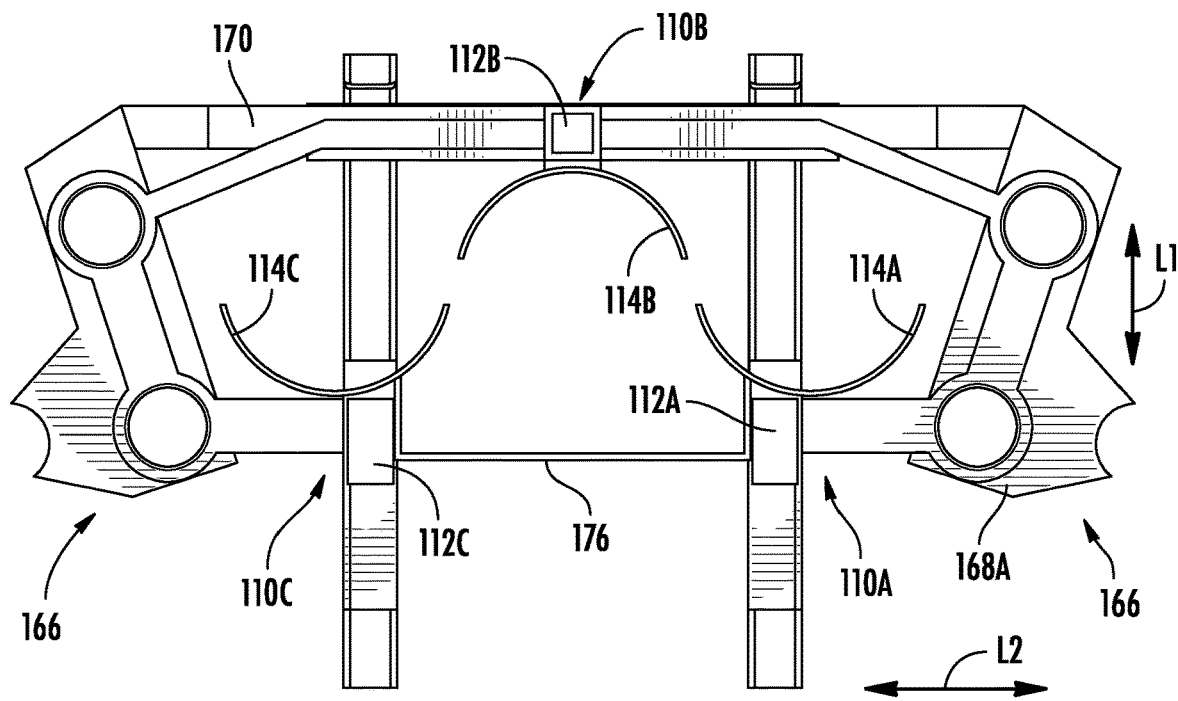

In variants, the mounts can be configured to be arranged: between the frame rails of a vehicle frame (e.g., on a Class 8 vehicle), centered above frame rails, laterally inboard of frame rails, laterally outboard of frame rails, and/or otherwise suitably arranged relative to a vehicle frame. When used with a Class 8 vehicle, the mounts are preferably arranged between the rear of the cab and the fifth wheel (and/or a keep-out region swept by the trailer during cornering; an example is shown in FIG. 3), but can be otherwise suitably configured. The set of mounts are preferably arranged substantially symmetrically relative to a sagittal plane (e.g., midsagittal plane; plane within a predetermined offset from midsagittal plane, such as within 5 inches, etc.; an example is shown in FIGS. 7A-7B) and/or frame rails, but can alternatively be asymmetric relative to a frame rail, and/or otherwise suitably distributed.

In variants, the mounts can be configured to position the pressure vessels with at least a predetermined offset/spacing (e.g., when the pressure vessels are at atmospheric pressure), such as shown by way of example in FIG. 3, wherein the predetermined offset/spacing can be: greater than the maximum diametric change of an individual vessel, less than half the radius of the vessel, greater than a maximum dynamic deformation of the vessel (e.g., in a maximal dynamic load case), less than 5 mm, 5 mm, 10 mm, 25 mm, 50 mm, 100 mm, greater than 100 mm, any range bounded by the aforementioned values, and/or any other suitable offset/spacing. The offset/spacing can be a lateral offset/spacing as shown in FIG. 3. In other variants, as shown in FIG. 3, the mounts can be configured such that the backings of adjacent mounts are longitudinally offset from one another. Stated differently, for an adjacent pair of mounts, a backing of a first mount of the adjacent pair can be spaced from a backing of a second mount of the adjacent pair along the longitudinal direction L1. This can facilitate mounting of the pressure vessels as well as mounting of the retention mechanisms.

However, the set of mounts can have any other suitable distribution, absolute arrangement, and/or relative arrangement in the system.

Figure 4:
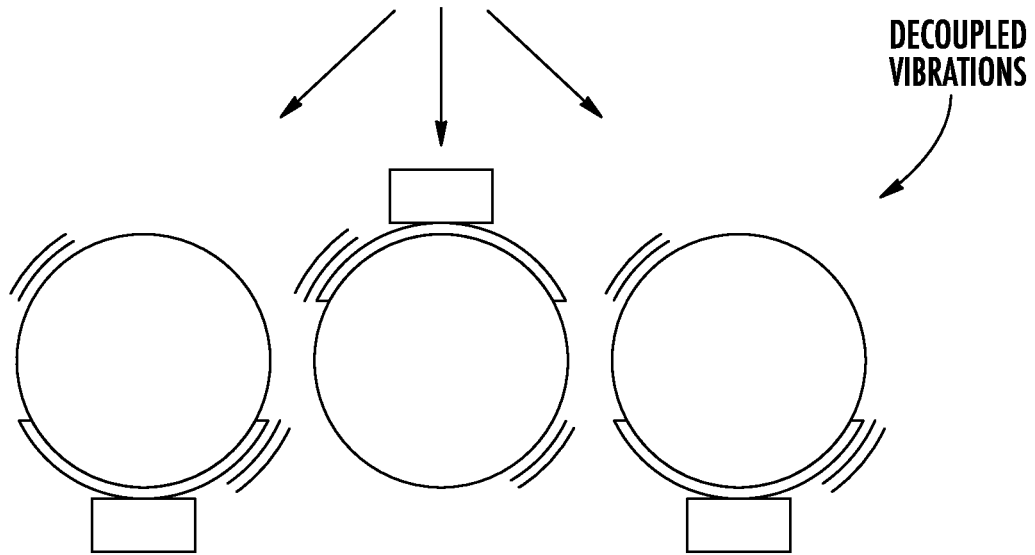
FIG. 4 is a cross-sectional schematic representation of a variant of the system from a top view.
Figure 9B:
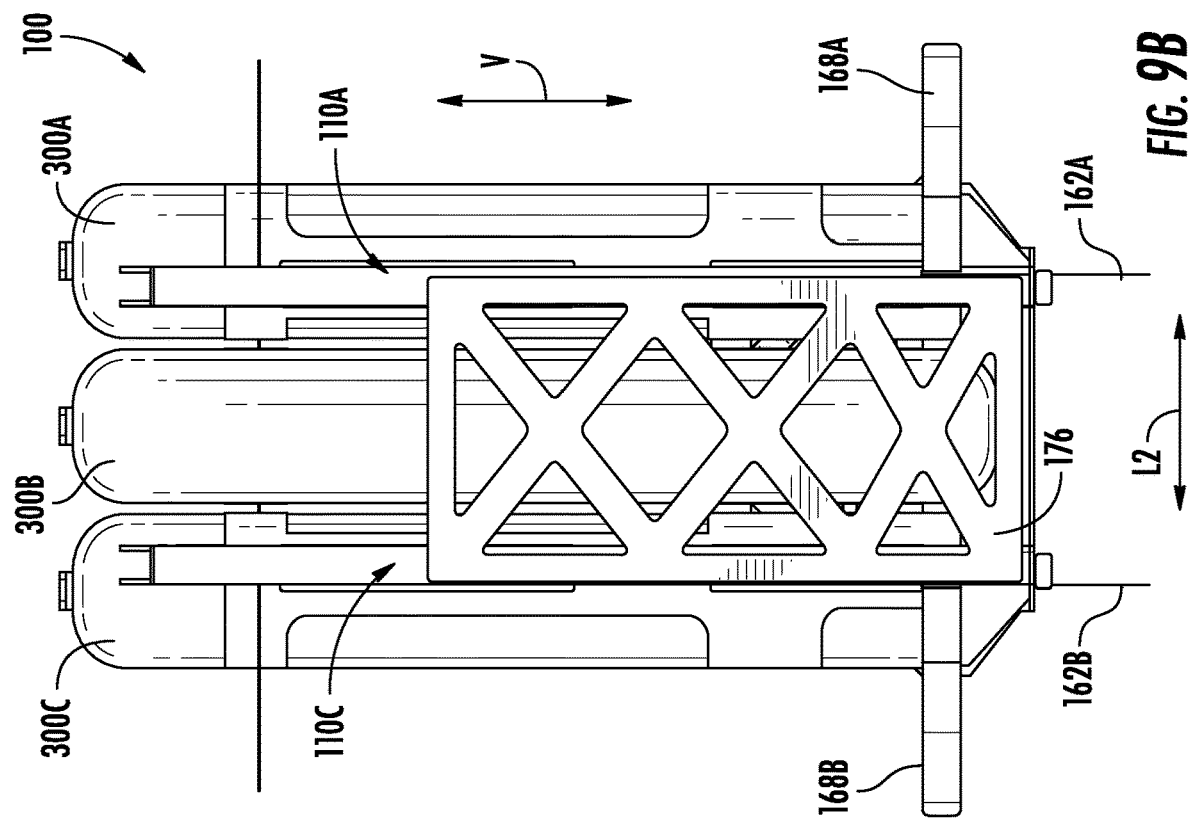
FIGS. 9A and 9B are a front and a rear view of a 3D representation of a variant of the system, respectively.
Figure 9A:
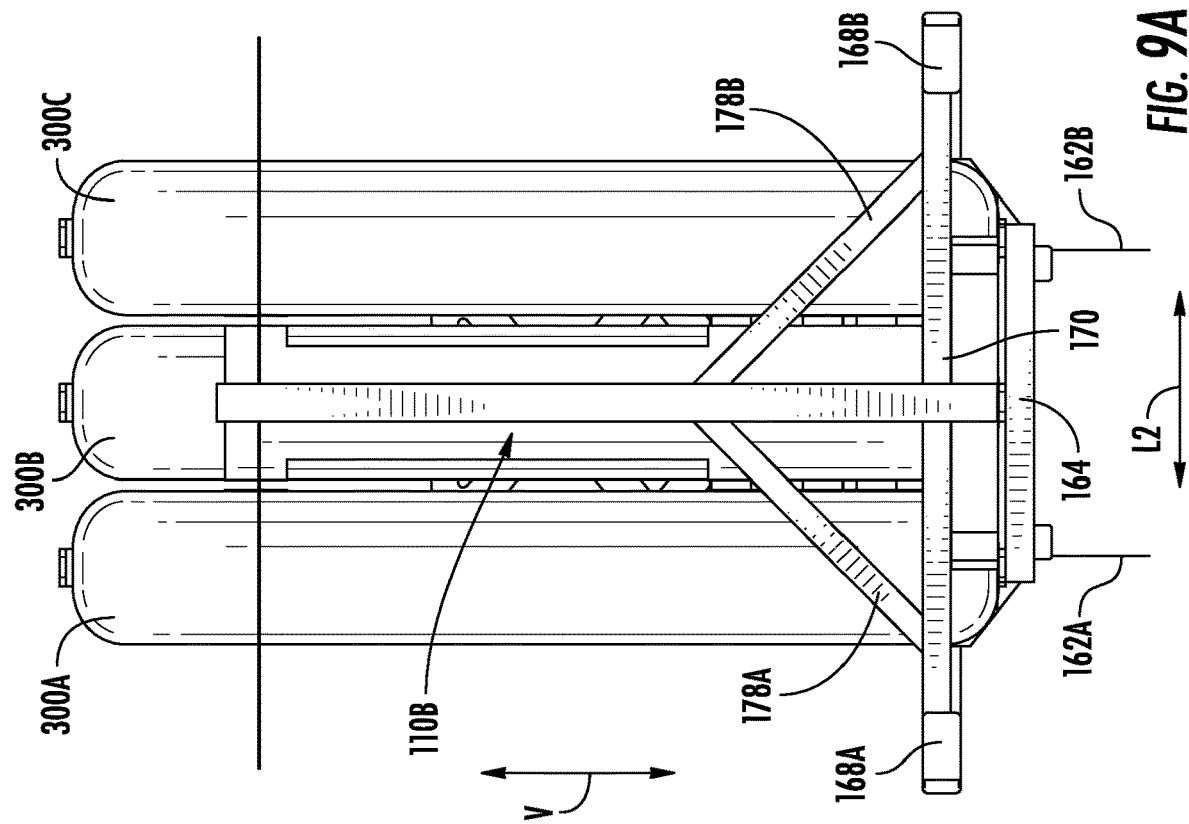
Figure 10:
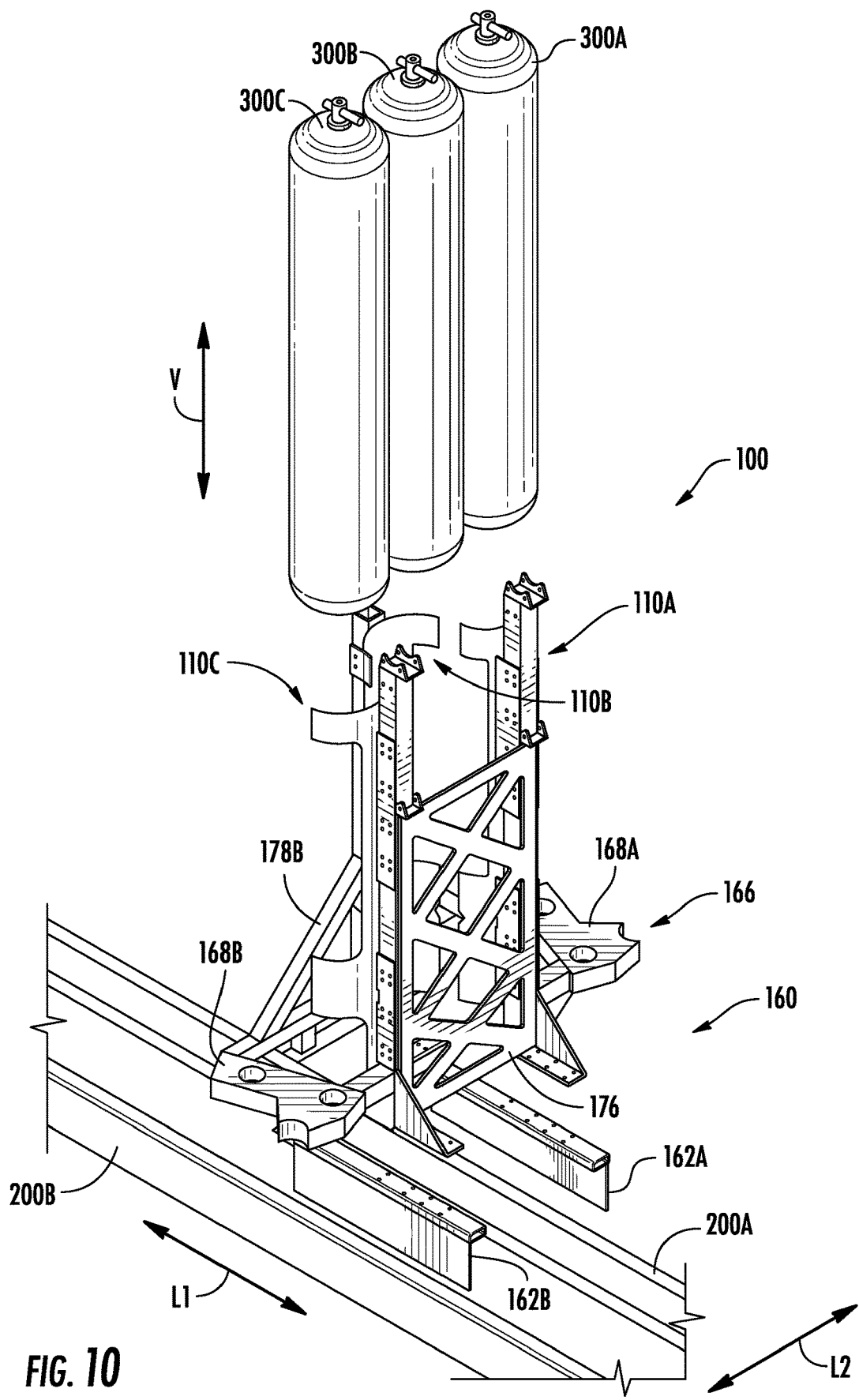
FIG. 10 is an exploded rear perspective view of a variant of the system.

The upper ends of the pressure vessel and/or mounts are preferably vertically cantilevered (an example is shown in FIG. 9A-9B) and separately connected to the subframe. Additionally or alternatively, the upper ends can be mechanically decoupled (an example is shown in FIG. 4) and partially vibrationally isolated from a remainder of the mounts/vessels (e.g., connected in parallel to the subframe and/or vehicle frame), which can mitigate the influence of common roadway vibrations and/or excitation modes (e.g., between 1 and 250 Hz, low-frequency/high-energy modes, etc.) on the system. As an illustrative example, a vibration at the upper end of a pressure vessel may only reach the upper end of a second pressure vessel by passing through the subframe or a dampening component (e.g., such as a damper or component with high flexibility/elasticity). The vertically cantilevered end of the mount and/or pressure vessel can represent a portion of the height/span of the pressure vessel which can be: 10%, 20%, 25%, 30%, 50%, 75%, greater than 75%, any range bounded by the aforementioned values, and/or any other suitable portion of the height/span of the pressure vessel.

However, the system can include any other suitable mounts.

The retention mechanism functions to retain and/or mechanically connect the pressure vessel to the mount. The retention mechanism is preferably a circumferential clamp such as a band clamp, T-bar clamp, Marman clamp, strap clamp, V-band clamp, screw clamp, spring clamp, and/or any other suitable clamp. Alternatively, the retention mechanism can be a split clamp, bolted connection, and/or can include any other suitable retention components/fasteners mechanisms.

The retention mechanism(s) preferably retain/secure individual pressure vessels to a respective mount such that every retention mechanism corresponds to exactly one pressure vessel, however pressure vessels can alternative connect to a plurality of mounts and/or secure plurality of pressure vessels (e.g., a split clamp retention mechanism, etc.). Preferably, two retention mechanisms (e.g., a pair) can be used to secure a pressure vessel (e.g., on opposing ends of a midplane orthogonal to the central/vertical axis of the pressure vessel); however, pressure vessels can be secured by a single retention mechanism, three or more retention mechanisms, and/or any suitable number of retention mechanisms can be used to secure each pressure vessel of the set. However, there can be any suitable number of retention mechanisms with any suitable correspondence to the set of pressure vessels and/or mounts.

The retention mechanism can optionally include spring elements and/or compression springs, such as those which are elastically deformable within a range of dimensional variance of the pressure vessel. As an example, the retention component can be a T-bar clamps which includes a spring element which—in an installed configuration—has a preload within a predetermined tolerance (e.g., between 500 and 2000 lbs; 800 lbs, 1000 lbs, 1500 lbs., etc.). However, the retention mechanism can alternatively be rigid and/or substantially non-deformable (e.g., resulting in deformation of the outer wall of the pressure vessel for a flexible-walled vessel, etc.).

However, the system can include any other suitable retention mechanism.

The system can optionally include or be used with a subframe which functions to connect the mounts (and/or remainder of the system) to the vehicle frame and/or functions to transfer forces/moments between the vehicle frame and the system. More specifically, the subframe can mechanically connect the mount(s) to the longitudinal frame rails of a Class 8 tractor respective a mounting position and/or mounting arrangement.

The subframe can include a spanning element(s) which connect to the frame rails (spanning the gap between the frame rails) below the pressure vessel(s), longitudinal elements (e.g., extending parallel to the frame rails), and/or vertical elements (e.g., connecting to the mount(s) below the cantilevered ends). The subframe is preferably arranged below the cantilevered ends of the pressure vessels (in a vertical direction), however the subframe can additionally or alternatively include a superstructure and/or additional structural elements which extend above the pressure vessels, connect to an upper end of the mount(s), and/or extend outboard of the pressure vessels. The subframe is preferably constructed from weldable steel, but can additionally or alternatively include other metals (e.g., aluminum, stainless, etc.), composites, polymers, and/or any other suitable set of materials. The subframe is preferably fastened to the vehicle using mechanical fasteners (e.g., bolted to the frame rails) but can otherwise suitably connect to the vehicle frame. However, the subframe can alternatively be integrated into the vehicle frame and/or system can include any other suitable subframe. Alternatively, the system can altogether exclude a subframe, such as in variants the mounts can be directly connected to a vehicle frame.

However, the system can include any other suitable components.

Figure 8A:
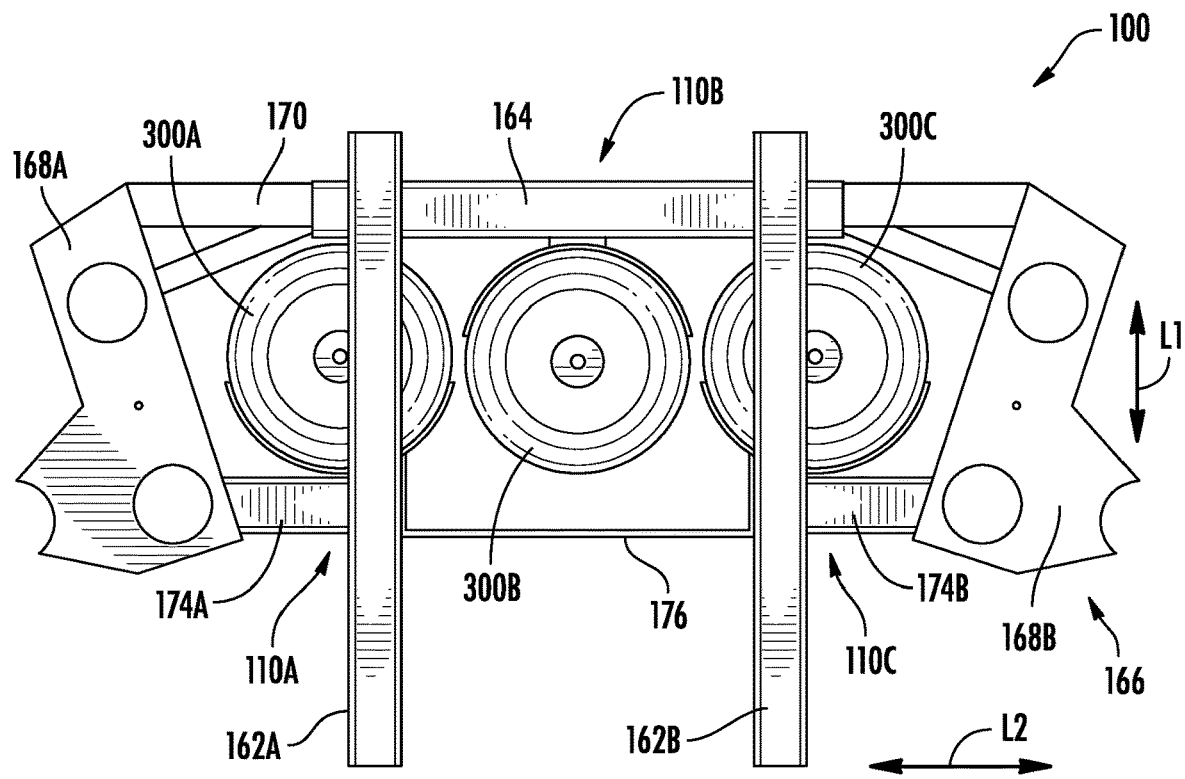
FIGS. 8A and 8B are a first and a second bottom view of a 3D representation of a variant of the system with mounted pressure vessels and without mounted pressure vessels, respectively.
Figure 8B:
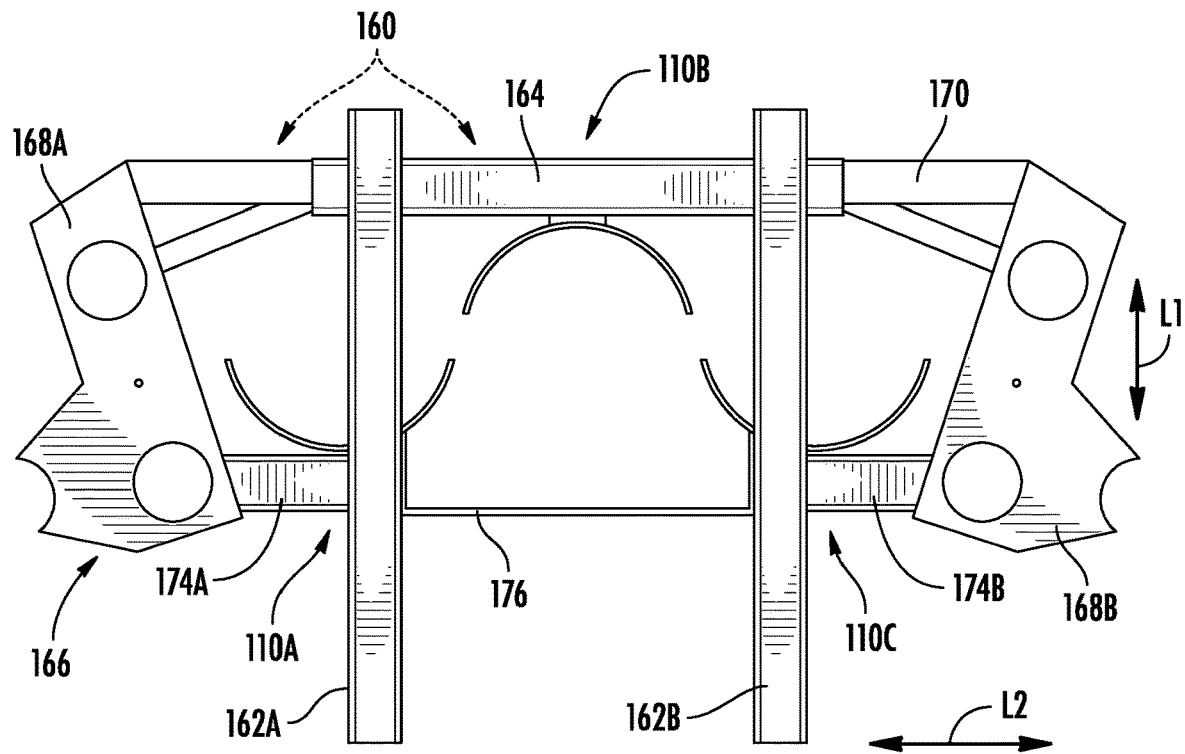

In some variants, with reference now to FIGS. 6, 7A, 7B, 8A, 8B, 9A, 9B, 10, and 11, the subframe 160 includes a first frame rail 162A and a second frame rail 162B spaced from the first frame rail 162A along the lateral direction L2 as shown in FIGS. 8A and 8B. The first and second frame rails 162A, 162B extend lengthwise along the longitudinal direction L1. A spanning frame rail 164 extends lengthwise along the lateral direction L2 and connects the first and second frame rails 162A, 162B. The first and second frame rails 162A, 162B can be mounted to or formed integrally with respective first and second vehicle frame rails 200A, 200B (FIGS. 10 and 11), e.g., of a Class 8 tractor.

Figure 11:
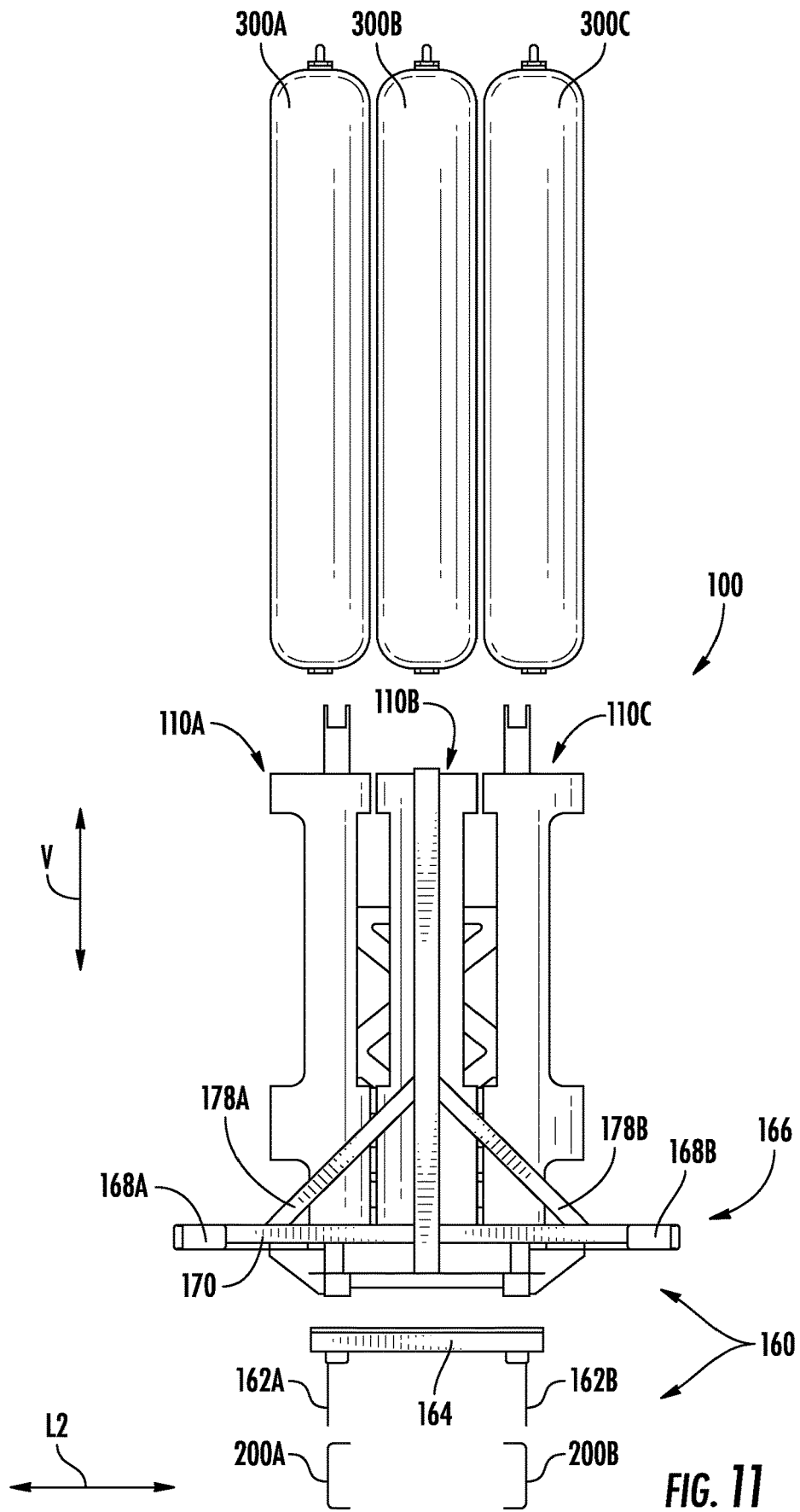
FIG. 11 is an exploded front view of a variant of the system.

Abase frame 166 is mounted on the first and second frame rails 162A, 162B and the spanning frame rail 164. The base frame 166 generally includes a first outboard member 168A, a second outboard member 168B spaced from the first outboard member 168A, e.g., along the lateral direction L2, and a spanning member 170 that extends lengthwise along the lateral direction L2 and connects the first outboard member 168A and the second outboard member 168B. The spanning member 170 can be seated on, integrally formed with, or otherwise connected to the spanning frame rail 164. The spine 112B of the second mount 110B is connected to the spanning member 170 of the base frame 166. Moreover, a first brace member 178A and a second brace member 178B (FIG. 9A) can extend from the spanning member 170 and connect to the spine 112B of the second mount 110B. The first and second brace members 178A, 178B can each extend at an angle with respect to the vertical direction V, e.g., as shown in FIGS. 9A and 11. The first and second outboard members 168A, 168B can structurally support carbon-recapture vessels (not pictured). Moreover, the first and second outboard members 168A, 168B can define one or more openings 172A, 172B that can facilitate mounting of the carbon-recapture vessels and can provide access for fluid lines to reach the carbon-recapture vessels.

The base frame 166 also includes a first inboard spanning member 174A and a second inboard spanning member 174B. Both the first and second inboard spanning members 174A, 174B are spaced from the spanning member 170, e.g., along the longitudinal direction L1. The first inboard spanning member 174A extends lengthwise from the first outboard member 168A along the lateral direction L2, e.g., toward the sagittal plane. The second inboard spanning member 174B extends lengthwise from the second outboard member 168B along the lateral direction L2, e.g., toward the sagittal plane. The spine 112A of the first mount 110A is connected to the first inboard spanning member 174A and the spine 112C of the third mount 110C is connected to the second inboard spanning member 174C. Accordingly, the spines 112A, 112B, 112C are each separably connected to the base frame 166 of the subframe 160. A support member 176 can span between and connect the spine 112A of the first mount 110A and the spine 112C of the third mount 110C. The support member 176 can include a number of truss structures to provide added support for the first and third mounts 110A, 110C.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A vehicular vessel mounting system, comprising:
a mount having a spine and a backing connected to the spine, the backing being arranged to contact and support a pressure vessel in a substantially vertical orientation, the pressure vessel has an upper end and a lower end; and
a retention mechanism arranged to retain the pressure vessel to the backing, and
wherein the mount arranges the pressure vessel so that the lower end is unloaded.

2. The vehicular vessel mounting system of claim 1, wherein the pressure vessel has a cylindrical outer wall, and wherein the backing contacts the cylindrical outer wall of the pressure vessel so that the upper end of the pressure vessel is vertically offset from a top end of the backing and the lower end of the pressure vessel is vertically offset from a bottom end of the backing.

3. The vehicular vessel mounting system of claim 1, wherein the pressure vessel has a cylindrical outer wall, and wherein the backing is shaped to match the cylindrical outer wall of the pressure vessel and arranged to contact the cylindrical outer wall of the pressure vessel over an extended area that spans vertically along at least fifty percent of a vertical span of the pressure vessel.

4. The vehicular vessel mounting system of claim 3, wherein the backing extends along a vertical portion of the pressure vessel that exceeds a vertical dimension of the retention mechanism.

5. The vehicular vessel mounting system of claim 3, wherein the backing extends circumferentially around less than half of the cylindrical outer wall of the pressure vessel.

6. The vehicular vessel mounting system of claim 3, wherein the backing extends circumferentially around the cylindrical outer wall of the pressure vessel so that a polar angle swept about a central axis of the pressure vessel is between twenty and one hundred seventy degrees.

7. The vehicular vessel mounting system of claim 1, wherein the retention mechanism is a first retention mechanism, and wherein the vehicular vessel mounting system further comprises:
a second retention mechanism spaced vertically from the first retention mechanism, and
wherein the backing extends along a vertical portion of the pressure vessel such that the backing extends vertically above the first retention mechanism and vertically below the second retention mechanism.

8. The vehicular vessel mounting system of claim 1, wherein the backing has a top support, a bottom support, and a center support connecting the top support and the bottom support, wherein the center support extends circumferentially around the pressure vessel so that a polar angle of the center support swept about a central axis of the pressure vessel is less than a polar angle of the top support swept about the central axis and less than a polar angle of the bottom support swept about the central axis.

9. The vehicular vessel mounting system of claim 1, wherein the backing has a backing plate and an elastomer layer attached thereto, the backing plate being connected to the spine and the elastomer layer being arranged to be positioned between the backing plate and the pressure vessel.

10. The vehicular vessel mounting system of claim 1, wherein the spine is connected to the backing along a convex side of the backing.

11. The vehicular vessel mounting system of claim 1, wherein the spine is arranged in a substantially vertical orientation and is connected to at least one of a subframe or a vehicle frame.

12. The vehicular vessel mounting system of claim 1, wherein a concave surface of the backing is arranged to contact the pressure vessel, and wherein the backing and the retention mechanism are elastically deformable to accommodate dimensional changes of the pressure vessel.

13. The vehicular vessel mounting system of claim 1, wherein the mount is one of a plurality of mounts each being arranged to support a respective one of a plurality of pressure vessels in a substantially vertical orientation.

14. The vehicular vessel mounting system of claim 13, wherein the plurality of mounts are arranged substantially symmetrically relative to a sagittal plane defined by the vehicular vessel mounting system.

15. The vehicular vessel mounting system of claim 13, wherein the plurality of mounts are arranged so that central axes of the plurality of pressure vessels are coplanar.

16. The vehicular vessel mounting system of claim 13, wherein the plurality of mounts are arranged so that central axes of at least two pressure vessels of the plurality of pressure vessels are arranged out of plane with one another.

17. The vehicular vessel mounting system of claim 13, wherein the plurality of mounts are arranged so that adjacent mounts of the plurality of mounts have opposing orientations with respect to a longitudinal direction so as to generate opposing and/or self-balancing pitch moments about a pitch axis.

18. The vehicular vessel mounting system of claim 13, wherein the vehicular vessel mounting system defines a longitudinal direction, and wherein the plurality of mounts are arranged so that mounts of at least one adjacent pair of mounts of the plurality of mounts have opposing orientations with respect to the longitudinal direction, and wherein a backing of a first mount of the at least one adjacent pair of mounts is spaced from a backing of a second mount of the at least one adjacent pair along the longitudinal direction.

19. A vehicular vessel mounting system defining a longitudinal direction, the vehicular vessel mounting system comprising:
a plurality of mounts, each mount of the plurality of mounts being arranged to support a respective one of a plurality of pressure vessels in a substantially vertical orientation and so that at least two mounts of the plurality of mounts have opposing orientations with respect to the longitudinal direction and are disposed on opposing sides of the plurality of pressure vessels.

20. A vehicular vessel mounting system defining a longitudinal direction, the vehicular vessel mounting system comprising:
a frame; and
a plurality of mounts each having a spine that is vertically oriented and a backing connected thereto for supporting a respective one of a plurality of pressure vessels in a substantially vertical orientation, the spine of each of the plurality of mounts being separately connected to the frame, the spine and the backing of each of the plurality of mounts being arranged so as to have alternating orientations with respect to the longitudinal direction.

21. A vehicular vessel mounting system, comprising:
a mount having a spine and a backing connected to the spine, the backing being arranged to contact and support a pressure vessel in a substantially vertical orientation, the pressure vessel has a cylindrical outer wall, and
wherein the backing is shaped to match the cylindrical outer wall of the pressure vessel and arranged to contact the cylindrical outer wall of the pressure vessel over an extended area that spans vertically along at least fifty percent of a vertical span of the pressure vessel.

22. A vehicular vessel mounting system, comprising:
a mount having a spine and a backing connected to the spine, the backing being arranged to contact and support a pressure vessel in a substantially vertical orientation; and
a first retention mechanism arranged to retain the pressure vessel to the backing; and
a second retention mechanism spaced vertically from the first retention mechanism and being arranged to retain the pressure vessel to the backing, and
wherein the backing extends along a vertical portion of the pressure vessel such that the backing extends vertically above the first retention mechanism and vertically below the second retention mechanism.

23. A vehicular vessel mounting system, comprising:
a mount having a spine and a backing connected to the spine, the backing being arranged to contact and support a pressure vessel in a substantially vertical orientation, and the backing has a top support, a bottom support, and a center support connecting the top support and the bottom support, wherein the center support extends circumferentially around the pressure vessel so that a polar angle of the center support swept about a central axis of the pressure vessel is less than a polar angle of the top support swept about the central axis and less than a polar angle of the bottom support swept about the central axis.

24. A vehicular vessel mounting system, comprising:
a plurality of mounts each being arranged to support a respective one of a plurality of pressure vessels in a substantially vertical orientation, each of the plurality of mounts having a spine and a backing connected to the spine, the backing of each one of the plurality of mounts being arranged to contact and support one of the plurality of pressure vessels in the substantially vertical orientation, and
wherein the plurality of mounts are arranged so that central axes of at least two pressure vessels of the plurality of pressure vessels are arranged out of plane with one another.

25. The vehicular vessel mounting system of claim 24, wherein the plurality of mounts are arranged so that adjacent mounts of the plurality of mounts have opposing orientations with respect to a longitudinal direction so as to generate at least one of opposing and self-balancing pitch moments about a pitch axis.

26. A vehicular vessel mounting system, comprising:
a plurality of mounts each being arranged to support a respective one of a plurality of pressure vessels in a substantially vertical orientation, each of the plurality of mounts having a spine and a backing connected to the spine, the backing of each one of the plurality of mounts being arranged to contact and support one of the plurality of pressure vessels in the substantially vertical orientation, and
wherein the plurality of mounts are arranged so that mounts of at least one adjacent pair of mounts of the plurality of mounts have opposing orientations with respect to a longitudinal direction, and wherein a backing of a first mount of the at least one adjacent pair of mounts is spaced from a backing of a second mount of the at least one adjacent pair along the longitudinal direction.

* * * * *